No. 619,785. Patented Feb. 21, 1899.
E. L. PERRY & E. L. PERRY, Jr.
BELLOWS FOLD COUPLING FOR VESTIBULE CARS.
(Application filed May 19, 1898.)
(No Model.)
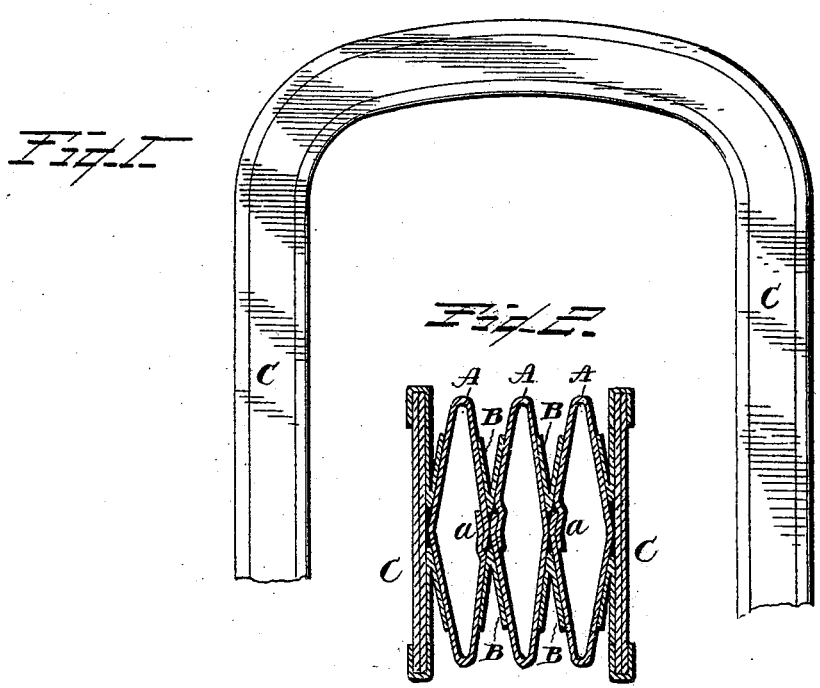
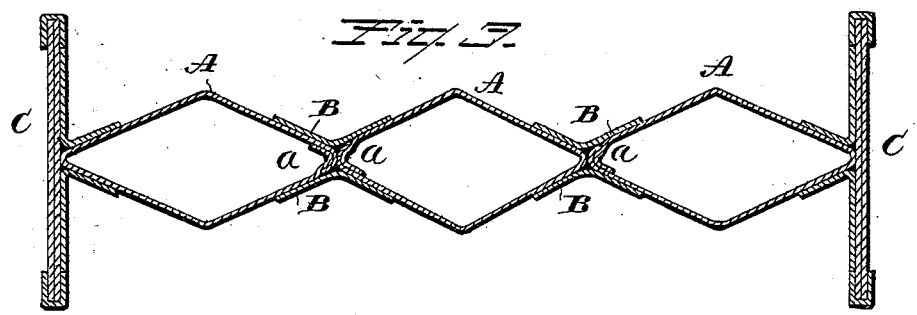
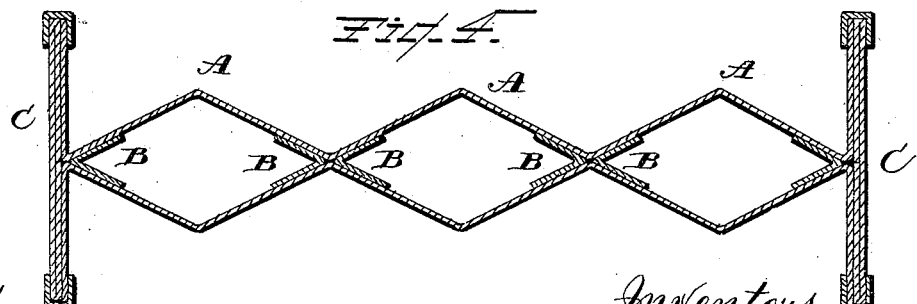
Witnesses
C. J. Williamson
Wm. B. Goddard
Inventors
Edward L. Perry
Edward L. Perry, Jr.
per Chas. H. Fowler
Attorney

UNITED STATES PATENT OFFICE.

EDWARD L. PERRY AND EDWARD L. PERRY, JR., OF PATERSON, NEW JERSEY.

BELLOWS-FOLD COUPLING FOR VESTIBULE-CARS.

SPECIFICATION forming part of Letters Patent No. 619,785, dated February 21, 1899.

Application filed May 19, 1898. Serial No. 681,159. (No model.)

*To all whom it may concern:*

Be it known that we, EDWARD L. PERRY and EDWARD L. PERRY, Jr., citizens of the United States, residing at Paterson, in the county of Passaic and State of New Jersey, have invented certain new and useful Improvements in Bellows-Fold Couplings for Vestibule-Cars; and we do hereby declare that the following is a full, clear, and exact description of the same, reference being had to the annexed drawings, making a part of this specification, and to the letters of reference marked thereon.

The present invention has reference to that class of devices which are employed in forming a connection between the ends of adjacent cars to complete a platform-vestibule, which devices are usually termed "bellows-fold couplings."

The invention consists in constructing a coupling of this class comprising a series or plurality of hollow sections which are expanded or contracted with the motion of the car, which hollow sections give to the coupling greater strength and durability and prevent the usual side motion incident to the ordinary bellows coupling.

Figure 1 of the drawings is a front elevation of a bellows-fold coupling. Fig. 2 is a horizontal section showing the hollow section contracted; Fig. 3, a similar view showing the hollow sections in an expanded position; Fig. 4, a similar view showing a modification of the invention.

In the accompanying drawings, A represents a plurality of hollow sections, either two, three, or more being used, as circumstances require, which hollow sections are constructed of a suitable flexible material, such as cotton duck and rubber or elastic compound. Each hollow section may be made from a separate piece of material, as shown in Fig. 3 of the drawings, the edges of the material overlapping, as shown at *a*, and vulcanized. Stays or gussets B are secured to the tubes A at the points of juncture to form a connection with the several hollow sections and prevent them from being pulled apart. The outer ones of the hollow sections are suitably connected to flexible flanges C, which flanges are for the purpose of attaching the coupling to the face-plate of the car-vestibule. These hollow sections A contract and expand to adapt them to the motion of the cars to which they are connected. The advantages of thus forming a bellows-fold coupling of a plurality of hollow sections is the increased strength and durability obtained, as well as lightness, and the advantage of retaining its position under all circumstances and against the liability of any side motion incident to the ordinary bellows-fold coupling.

In Fig. 4 of the drawings is shown a modification of the construction indicated in Fig. 3, the hollow sections being composed of two continuous strips of material instead of each section being composed of a separate piece of material.

Having now fully described our invention, what we claim as new, and desire to secure by Letters Patent, is—

A bellows-fold coupling comprising a plurality of hollow sections, and stays or gussets secured at a point of connection between the hollow sections, substantially as and for the purpose specified.

In testimony that we claim the above we have hereunto subscribed our names in the presence of two witnesses.

EDWARD L. PERRY.
EDWARD L. PERRY, JR.

Witnesses:
W. B. ACKER,
GEO. M. COPENHAVER.